Figure 1:
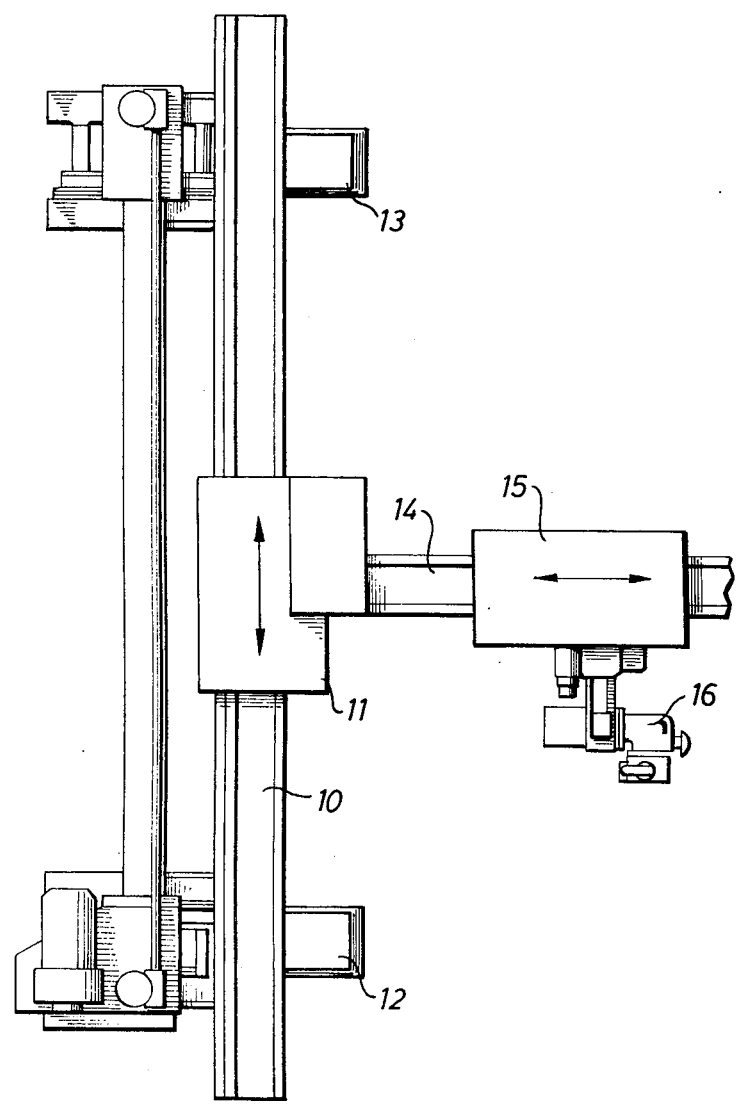

United States Patent [19]

Sandstrom

[11] 3,935,420
[45] Jan. 27, 1976

[54] MEANS FOR GUIDING THE WELDING UNIT OF AN AUTOMATIC WELDING APPARATUS ALONG THE JOINT LINE BETWEEN WORKPIECES TO BE WELDED TOGETHER

[76] Inventor: Stig Rune Sandstrom, Borlebrovagen 28, 372 00 Ronneby, Sweden

[22] Filed: Dec. 18, 1973

[21] Appl. No.: 425,797

[30] Foreign Application Priority Data
Dec. 29, 1972 Sweden............................ 17202/72

[52] U.S. Cl....................... 219/125 R; 219/125 PL
[51] Int. Cl.²........................................... B23K 9/12
[58] Field of Search.......... 219/124, 125 R, 125 PL, 219/126

[56] References Cited
UNITED STATES PATENTS

| | | | |
|---|---|---|---|
| 2,911,517 | 11/1969 | Armstrong | 219/125 R |
| 3,171,012 | 2/1965 | Morehead | 219/124 |
| 3,258,577 | 6/1966 | Smith | 219/125 R X |
| 3,510,626 | 5/1970 | Hasegawa | 219/125 R |
| 3,783,222 | 1/1974 | Gwin et al. | 219/125 R X |

*Primary Examiner*—J. V. Truhe
*Assistant Examiner*—N. D. Herkamp
*Attorney, Agent, or Firm*—Hammond & Littell

[57] ABSTRACT

An improved means for guiding the welding unit of an automatic welding apparatus along the joint line between workpieces to be welded together, said workpieces being previously joined together by welding bridges mutually spaced along the joint line, the automatic welding apparatus being of the type having a longitudinally extending beam on which a carriage is arranged for longitudinal movement, said carriage supporting a transverse beam extending substantially at right angles to the longitudinal beam, the transverse beam supporting a laterally moveable carriage to which a welding unit is attached, said guiding means comprising a guide member arranged to move on the joint line between two workpieces to be welded together and to guide the welding unit laterally, a support member arranged to move behind the guide member and to engage at least one of said workpieces and to support the welding unit, which welding unit is movable vertically independent of the support member so as to control the height of the welding unit above the joint line, said guide member being arranged to be moved vertically without affecting the height of the welding unit above said joint line during longitudinal movement of said welding unit during welding operation and furthermore being arranged on a rod which is vertically movable in a pivotable structure and held in an outwardly extended position by means of a pressure spring, said rod being arranged to be moved into a sleeve member when the guide member is placed on the joint line, and wherein said rod is provided with an operating means so arranged that, when the rod occupies its retracted position in said sleeve, the operating means is out of engagement with a switch means and, when the rod is fully extended said operating means actuates said switch means so as to activate welding unit retaining means arranged to prevent said unit from falling down when the support member passes over the end edge surface of the work pieces as well as an automatic welding apparatus.

2 Claims, 7 Drawing Figures

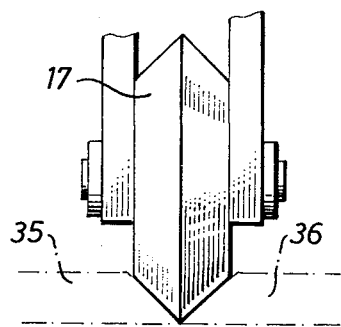
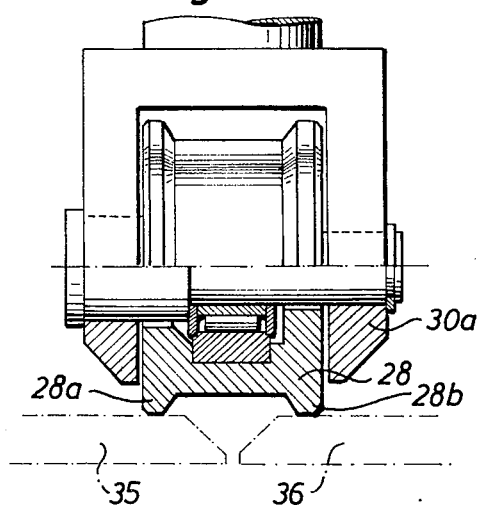
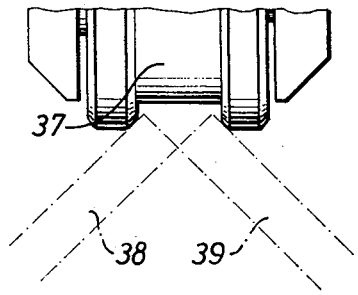
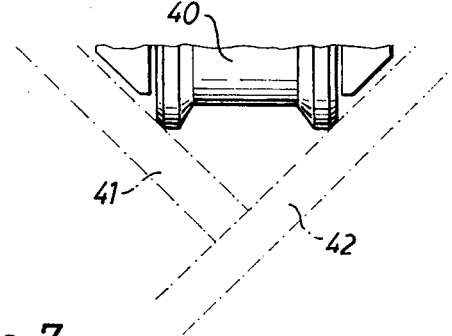
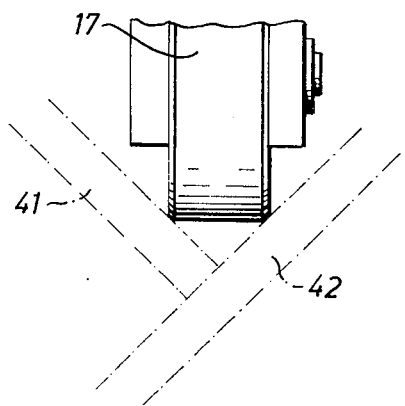

MEANS FOR GUIDING THE WELDING UNIT OF AN AUTOMATIC WELDING APPARATUS ALONG THE JOINT LINE BETWEEN WORKPIECES TO BE WELDED TOGETHER

The present invention relates to means for guiding the welding unit of an automatic welding apparatus along the joint line between work-pieces which are to be welded together, said welding unit being arranged for longitudinal and lateral movement relative to said joint line.

There are known to the art automatic welding apparatus of the type comprising a beam which extends in the longitudinal direction of the welding apparatus and on which a carriage is arranged for movement in the long direction of the beam. The welding unit of the apparatus is attached to the carriage, so that a weld can be made between two adjacent workpieces when the carriage is moved along the beam. Prior to welding the workpieces together, said workpieces are adjusted so that the electrode of the welding unit is located above the line along which the weld is to be made, this line being referred to hereinafter as the joint line. During a welding operation, the carriage is moved at a convenient speed along the beam and the welding unit is made to follow a path parallel with the beam to provide a continuous weld.

One disadvantage with automatic welding apparatus of this type is that the workpieces must be very accurately aligned, so that the joint to be welded lies exactly parallel with the beam. If there is any divergence between the beam and the joint line, the weld will not be placed exactly in the joint, thereby greatly impairing the quality of the weld joint.

To eliminate this disadvantage, it has been necessary hitherto to manually superintend the working of such automatic welding apparatus, so that the necessary adjustance can be made manually to the welding unit in all planes during a welding operation. This greatly increases the cost of a welding operation.

The main object of the present invention is to provide means for guiding the welding unit of automatic welding apparatus along the joint line between workpieces to be welded together, whereby the task of manually supervising the welding operation is obviated.

It is previously known, for example from the U.S. Pat. No. 2,749,421, to use guide wheels for following the joint line between workpieces to be welded together, the guide wheels being arranged to adjust the position of the welding unit so that said unit follows the joint line even when said line deviates slightly from the longitudinal direction of the welding apparatus. With the arrangement disclosed in the U.S. Pat. No. 2,749,421, the actual welding unit is pivotally mounted and hinged in a manner such that a certain displacement of the guide means causes the welding unit to be swung outwardly in either direction, thereby compensating the position of the welding unit for the deviation in direction of the joint line relative to the longitudinal beam. Such an arrangement, however, is only capable of making corrections for small deviations in the direction of the joint line. Further, the quality of the weld joint is also affected by the oblique positioning of the welding apparatus. Since it is necessary to suspend the welding unit so that it can be pivoted in all directions, the suspension arrangement is also complicated and expensive, without achieving a fully satisfactory mode of operation of said arrangement. A further disadvantage with joint line following devices having a single wheel running in the joint line is that the welding unit is lifted each time the width of the joint line decreases beneath a certain minimum value or when the joint disappears completely, which happens occasionally owing to the fact that the adjacently lying edge surfaces of the work pieces are not completely straight, and each time a previously arranged welding bridge is passed. Welding bridges are normally arranged at uniformly spaced intervals along the workpieces, to position the workpieces relative to each other in preparation for making the continuous weld there along. The distance between the weld bridges is normally 3–5 dm, which means that the welding unit during its movement along a joint line, which may have length of from 1 to 2 meters, will be lifted a number of times, whereby the quality of the weld joint will vary along the joint line or the welding unit will fail to make a weld at places along the workpieces, owing to the fact that the electrode of the welding unit is moved to such a distance from the workpieces that the light arc is distinguished.

A further object of the invention is therefore to provide a guide means which operates in a manner such that the weld unit is not affected, or only slightly affected as the welding unit passes the aforementioned, pre-made weld bridges, and which permits large deviations between the direction of the joint and the long direction of the automatic welding apparatus without the quality of the weld being impaired.

So that the invention will be more readily understood and other features thereof made apparent, a guide means constructed in accordance with the invention will now be described with reference to the accompanying drawing, in which FIG. 1 is a diagrammatic, horizontal view of an automatic welding apparatus incorporating the guide means of the invention and having a carriage arranged to move longitudinally and a carriage arranged to move transversely.

Figure 2:
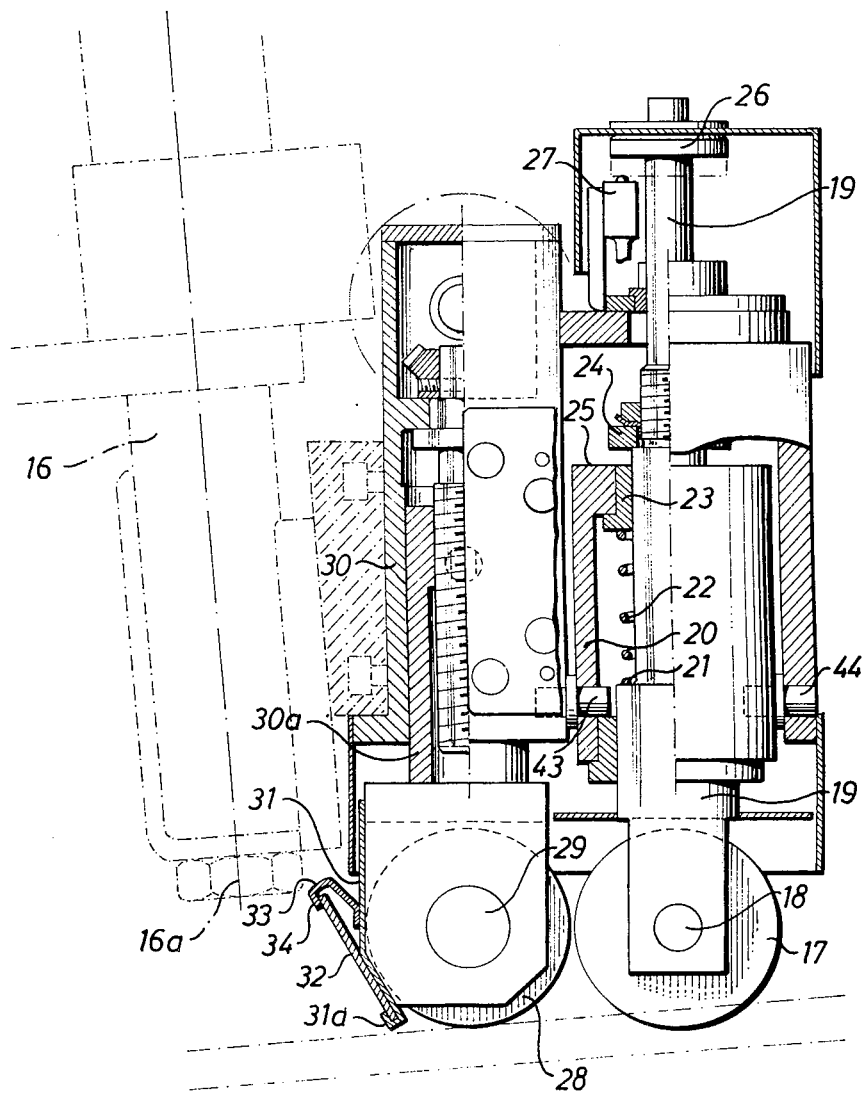

FIG. 2 illustrates an embodiment of the invention, comprising a joint following guide means having guide wheels and supporting wheels, FIGS. 3–7 show different embodiments of the guide wheels and support wheels of the guide means shown in FIG. 2 for welding different types of weld joints.

The automatic welding apparatus shown diagrammatically in FIG. 1 comprises a longitudinally extending beam 10 on which a carriage 11 is arranged for longitudinal movement. The longitudinally extending beam 10 of the automatic welding apparatus is supported by two spaced-apart vertically movable frame arms 12, 13. A transverse beam 14 is arranged on the carriage 11 substantially at right angles to the long beam. Arranged for transverse movements on the transverse beam 14 is a carriage 15 provided with a driving motor. The carriage 15 supports the welding unit 16.

When a weld is to be made automatically between two workpieces by means of the illustrated automatic welding apparatus, the workpieces are first positioned adjacent each other in the desired manner on the working table of said apparatus. In this respect it is normally necessary to first position the workpieces in relation to each other by means of a number of spaced apart weld bridges and to align the joint line so that it lies approximately parallel with the longitudinal beam of the welding apparatus. When this preparatory work is completed, the longitudinally movable carriage 11 is brought to its starting position and the transversely movable carriage 15 is moved on the transverse beam 14 until the electrode of the welding unit 16 is located centrally above the joint line. Since the joint line need not be positioned exactly parallel with the longitudinal direction of the transverse beam and since the welding unit can be moved laterally, the work which must be carried out to prepare the workpieces for a welding operation is much simpler and less time consuming than with previously known automatic welding apparatus. FIG. 2 is a sectional view through the joint-line following means of the present invention. With the illustrated embodiment, the joint line following means is attached to the welding unit and includes a guide wheel 17 arranged to roll in the joint line during an automatic welding operation. The guide wheel is rotatably mounted on a shaft 18 arranged on a vertically movable rod 19. The frame is mounted to a structure 20 capable of being pivoted around two pins 43, 44, and is provided with a shoulder 21 against one end of which a pressure spring 22 is arranged to abut. The other end of the pressure spring is arranged to abut a bearing sleeve 23 for the rod 19 inserted in the structure 20, the arrangement being such that the rod is normally held in its lowermost, fully outwardly extended position by a force of certain magnitude, in which position a plate 24 attached to the rod abuts a stop surface 25 on the pivotable structure 20. While the guide wheel 17 rolls in the joint line during a welding operation, part of the rod 19, however, is located in the structure 20, so that as the guide wheel passes the end of the workpieces the rod 19 will be projected further out of the structure 20.

If the width of the joint line is too small to accomodate the wheel 17 during its passage along the joint line, or the wheel 17 meets a welding bridge, the wheel will be urged upwards, whereupon the rod 19 carrying the wheel is pushed into the structure 20 against the action of the spring 22. Subsequent to the wheel passing the welding bridge or when the width of the joint line is sufficient to accomodate the wheel, the rod 19 is moved out of the structure 20 by means of the spring 20, so that the wheel is returned into the joint line and continues to roll along the same.

As previously mentioned, the rod 19 supporting the wheel 17 is so arranged that said rod is moved out of the pivotable structure to a certain extent by the spring at the end of the joint line, at the end of the workpieces. The upper end of the rod 19 is provided with a plate 26 which during a joint-line following operation lies remote from an electric switch 27 stationarily arranged on one side of the rod 19. When the guide wheel 17 passes the end edges of the workpieces, the rod 19 is extended by the spring to its maximum extent, whereby the plate 26 on the rod 19 actuates the switch 27. The switch 27 is connected in an electric-current circuit, which is arranged so that actuation of the switch can be used to lock the welding unit securely to the carriage 15, via a relay or like device, so that the welding unit does not fall against the workpieces when a further supporting wheel 28, hereinafter described, passes the end edges of the workpieces. The fact that locking of the welding unit subsequent to the guide wheel leaving the joint line renders it impossible to move said unit vertically or laterally does not constitute any particular disadvantage, since the remaining portion of the joint to be welded is very short.

When seen in the movement of direction of the welding apparatus, there is arranged, preferably but not necessarily behind the guide wheel 17a further guide wheel 28. The guide wheel 28 is arranged to engage at least one, and preferably both workpieces during a welding operation. The support wheel 28 is mounted for rotation on a shaft 29, which is journalled between the legs of a bifurcate member 30a, which is attached to a supporting portion 30, which in turn is mounted on the welding unit 16. The welding unit is arranged on the transversely movable carriage 15 and is mounted for vertical movement by means of a plain bearing, so that the support wheel 28 will guide the welding unit vertically over the joint line. The welding unit 16 together with the weld electrode 16a has been shown with dash-dot lines in FIG. 2, the pivotable structure 20 and the switch 27 are also mounted on the support member 30.

The bifurcate member 30a is provided with a downwardly projecting plate 31, which is arranged to support an asbestos plate 32. The lower portion of the plate 31 is angled, so that the end of the plate projects into the space formed between the support wheel 28 and the workpieces and welding nozzle respectively. The lowermost end of the plate 31 has a U-shaped edge 31a and is provided at a position above said edge 31a with an outwardly projecting arm 33 having a curved edge 34 at its free end. As will be understod, a new asbestos plate 32 can be readily inserted between the U-shaped lower edge 31a and the curved upper edge 34 when required. The purpose of the asbestos plate is to prevent splashes from the weld electrode 16a during a welding operation from striking the support wheel 28 and adhering thereto, while at the same time protecting the support wheel and its bearings from heat radiating from the weld. A special advantage afforded by the asbestos plate is that it does not constitute a surface against which splashes occurring from the weld electrode could, as would a metal plate. The ease in which the asbestos plate can be replaced also enables the operator to insert a new asbestos plate with the minimum of time loss. The protective asbestos plate is particularly advantageous, since in order to afford optimum vertical guidance of the weld unit, the support wheel should be located close to the weld electrode 16a.

FIG. 3 shows diagrammatically a guide wheel 17 located in a joint line between two workpieces 35 and 36. The shape of the guide wheel can be chosen according to the shape of the joint being made.

With the embodiment shown in FIG. 4, the support wheel, here designated 28, has the form of a cylinder with two outwardly projecting flanges 28a and 28b arranged one at either end thereof. The cylinder is so dimensioned that the two flanges 28a and 28b lie on either side of the joint line between the workpieces 35 and 36, as shown in the Figure. In this way there is ensured positive abutment between the support wheel and the workpieces. The cylinder is mounted for rotation in a bifurcate portion 30a connected with the support member 30. The support member 30, and therewith also the welding unit, will thus follow the workpieces at a determined and manually adjustable distance above the joint to be welded. The distance of the welding unit above the joint line during a welding operation is thus not affected by any deviations in width of the joint line, neither is it affected by the occurrence of welding bridges between the two workpieces.

FIG. 5 shows an embodiment having a support wheel 37 for effecting a weld in the external angle between two obliquely positioned plates 38 and 39. FIG. 6 shows an embodiment having a support wheel 40 for effecting a weld at the internal connection between two plates 41 and 42 placed angularly with respect to each other. FIG. 7 shows a modified embodiment of the guide wheel 17 for effecting a weld of the type shown in FIG. 6.

As before mentioned, the rod 19 supporting the guide wheel 17 is arranged in a structure 20 which is pivotally mounted around two pins 43 and 44, so that said structure can pivot around the axes of said pins. The pivoting movement of the structure 20 is utilized to guide a servo means (not shown) arranged to control an electric drive motor for the transversely movable carriage 15, so that said carriage can be moved on the transverse beam 14 in a direction such as to compensate pivoting movement of the rod.

Although the joint-line following means of the present invention has been described solely with reference to one embodiment thereof, it will be understood that the said means can be modified and changed in a number of ways within the scope of the inventive idea. For example, it is possible to arrange more than one support wheel on each side of the joint line, and the support wheel can be replaced by a runner-like slide means, in the slide surfaces of which can be arranged balls or rollers for reducing the friction between said slide surfaces and the workpieces. It is also conceivable to use one support wheel on only one side of the joint line, in which case said support wheel should only be arranged to support the whole weight of the welding unit. The design of the support member may be adapted to the weld to be made. Further, it is convenient to suspend the support member in a manner such that it can be readily replaced. This is also applicable to the guide wheel, which should be readily replaceable so that said means can be adapted to different types of welds and chamfers on the edges of the workpieces. It is also conceivable to replace the guide wheel with a guide pin or a guide plate arranged to follow the joint line. If the welding unit is light or the weight of said unit is balanced, the aforementioned servo control may optionally be excluded and the guide member may be arranged to effect the desired displacement of the welding unit during a jointline following operation by a direct mechanical connection with said welding unit. It is also conceivable to fixedly arrange the guide member and to exclude the servo control means, and instead to permit the guide member to move the positioned workpieces so that the requisite alignment of the joint line relative to the welding unit is obtained. This latter alternative, however, is conceivably only possible when the workpieces are relatively light or when special provision is made to enable ready displacement of the workpieces. The electrical contacts may also be positioned and arranged in many different ways to obtain the desired energizing and deenergizing of said means when the guide member is moved to its fully extended position.

I claim:

1. Means for guiding the laterally and vertically movable welding unit of an automatic welding apparatus along the joint line between workpieces to be welded together, said workpieces being previously joined together by welding bridges mutually spaced along the joint line, the automatic welding apparatus being of the type having a first beam, a first carriage carried by said first beam and displaceable along the same, a second beam attached to said first carriage and extending substantially perpendicular to said first beam, a second carriage carried by said second beam and displaceable along the same, and a welding unit supported by said second carriage, said welding unit comprising a support member resting upon at least one of said workpieces during welding, the welding unit being movable vertically solely dependent upon the vertical position of the support member, electrical locking means operable for preventing vertical movement of said welding unit, and a joint line follower structure positioned in front of said support member, said last mentioned structure comprising a joint line following means, a rod having a lower exposed end supporting said following means, a pivot structure pivotable in a direction mainly perpendicular to said joint line and comprising means slidingly supporting said rod for restricted vertical movement of the same, upper and lower stop means defining the upper and lower limits, respectively, for said vertical movement, a pressure spring urging said rod downwards to press said following means against the joint line, a switch controlling the operation of said electrical locking means, and a switch operating means fastened to said rod, the mutual spacing and arrangement of said switch and said operating means being such that the switch is unaffected by the operating means when said following means is in contact with a joint line, but is operated by said operating means to activate said locking means to prevent the welding unit from falling down when said support member is going to pass over an end edge surface of the work pieces.

2. An automatic electric welding apparatus comprising a joint line follower for guiding a laterally and vertically movable welding unit along the joint line between workpieces during welding, a support member positioned behind the joint line follower and resting upon at least one of said workpieces during welding, the welding unit being movable vertically solely in dependence upon the vertical position of the support member, and a plate-like protecting means positioned between the support member and the electrode of the welding unit for preventing weld splash from fastening to the support member during welding and protecting the support member from heat radiation from the weld joint, said protecting means extending into the space between the support member and the workpieces and comprising a replaceable asbestos plate inserted between two curved edges of a holder projecting downwardly from the welding unit.

* * * * *